United States Patent [19]

Ichiishi et al.

[11] Patent Number: 5,244,647

[45] Date of Patent: Sep. 14, 1993

[54] PROCESS OF PREPARING HEXAAMMINERHODIUM TRIHYDROXIDE, HEXAAMMINEPLATINUM (IV) TETRAHYDROXIDE, TETRAAMMINEPLATINUM (II) DIHYDROXIDE AND TETRAAMMINEPALLADIUM DIHYDROXIDE

[75] Inventors: Satoshi Ichiishi; Yuki Kirioka; Sachiko Asakura, all of Chiba, Japan

[73] Assignee: Tanaka Kinkinzoku Kogyo K.K., Tokyo, Japan

[21] Appl. No.: 7,871

[22] Filed: Jan. 22, 1993

Related U.S. Application Data

[63] Continuation-in-part of Ser. No. 873,172, Apr. 24, 1992, abandoned.

[30] Foreign Application Priority Data

| Aug. 29, 1990 | [JP] | Japan | 2-227538 |
| Aug. 29, 1990 | [JP] | Japan | 2-227539 |
| Aug. 29, 1990 | [JP] | Japan | 2-227540 |
| Apr. 26, 1991 | [JP] | Japan | 3-124904 |

[51] Int. Cl.$^5$ .................. C01B 21/00; C01B 21/20
[52] U.S. Cl. ................................. 423/387; 423/413
[58] Field of Search ........................ 423/387, 413

[56] References Cited

U.S. PATENT DOCUMENTS

| 4,082,625 | 4/1978 | Crosby | 423/413 |
| 4,196,178 | 4/1980 | Iwai et al. | 423/413 |
| 4,335,087 | 6/1982 | Rhoda | 423/413 |
| 4,512,963 | 4/1985 | Abys et al. | 423/387 |

OTHER PUBLICATIONS

Chemical Abstracts citation 116 (26): 258538y.

Primary Examiner—Wayne Langel
Attorney, Agent, or Firm—Sughrue, Mion, Zinn, Macpeak & Seas

[57] ABSTRACT

A process of hexaamminerhodium trihydroxide, hexaammineplatinum (IV) tetrahydroxide, tetraammineplatinum (II) dihydroxide and tetraamminepalladium dihydroxide. Hexaamminerhodium trihydroxide is prepared by forming a solution of hexaamminerhodium (III) chloride by reacting a solution of rhodium (III) chloride and an excess amount of aqueous ammonia, heating the thus formed solution to impart thereto a pH of 7.5 to 8.0, and contacting the hexaamminerhodium (III) chloride solution with an anion exchange resin having an OH form. Hexaammineplatinum (IV) tetrahydroxide is prepared by dissolving ammonium chloroplatinate into aqueous ammonia, and contacting the resulting solution of hexaammineplatinum (IV) tetrachloride with an anion exchange resin having an OH form. Tetraammineplatinum (II) dihydroxide is prepared by contacting a solution of tetraammineplatinum (II) dichloride with an anion exchange resin having an OH form. Tetraamminepalladium dihydroxide is prepared by contacting a solution of tetraamminepalladium dichloride with an anion exchange resin having an OH form. The resulting product solutions have a remarkably reduced chloride ion concentration and exhibit high stability. Furthermore, a silver component is not required, such that purity of the respective product solutions is elevated.

8 Claims, No Drawings

PROCESS OF PREPARING HEXAAMMINERHODIUM TRIHYDROXIDE, HEXAAMMINEPLATINUM (IV) TETRAHYDROXIDE, TETRAAMMINEPLATINUM (II) DIHYDROXIDE AND TETRAAMMINEPALLADIUM DIHYDROXIDE

CROSS REFERENCE TO RELATED APPLICATIONS

This application is a continuation-in-part of application Ser. No. 07/873,172, filed Apr. 24, 1992 abandoned.

FIELD OF THE INVENTION

The present invention relates to a process of preparing hexaamminerhodium trihydroxide (hereinafter referred to as "HARhTH"). The present invention also relates to a process of preparing hexaammineplatinum (IV) tetrahydroxide (hereinafter referred to as "HAPtTH"). The present invention additionally relates to a process of preparing tetraammineplatinum (II) dihydroxide (hereinafter referred to as "TAPtDH"). The present invention also relates to a process of preparing tetraamminepalladium dihydroxide (hereinafter referred to as "TAPDH").

BACKGROUND OF THE INVENTION

Heretofore, HARhTH has been prepared as its solution by adding silver oxide to a solution of hexaamminerhodium chloride to prepare a HARhTH solution and a precipitate of silver chloride, which precipitate was then removed by filtration. Similarly, HAPtTH has heretofore been prepared as its solution by adding silver oxide to a solution of hexaammineplatinum (IV) tetrachloride to prepare a HAPtTH solution and a precipitate of silver chloride, which precipitate was then removed by filtration. Likewise, TAPtDH has heretofore been prepared as its solution by adding silver oxide to a solution of tetraammineplatinum (II) dichloride to prepare a TAPtDH solution and a precipitate of silver chloride, which precipitate was then removed by filtration. Similarly, TAPDH has heretofore been prepared as its solution by adding silver oxide to a solution of tetraammine-palladium dichloride to prepare a TAPDH solution and a precipitate of silver chloride, which precipitate was then removed by filtration.

However, in each of the above described techniques, it was difficult to perform an equivalence reaction between the silver and the chloride ion to determine the amount of silver to be added. Consequently, excess silver was likely to remain in the product solution as an impurity.

Thus, there is a need in the art to provide a process of preparing a solution of each of the above noted compounds having reduced impurity levels. The present invention overcomes the above described disadvantages of the prior art.

SUMMARY OF THE INVENTION

A first object of the present invention is to provide a process of preparing a HARhTH solution having a low impurity level.

A second object of the present invention is to provide a process of preparing a HARhTH solution by means of anion exchange.

A third object of the present invention to provide a process of preparing a HAPtTH solution having a low impurity level.

A fourth object of the present invention to provide a process of preparing a HAPtTH solution by means of anion exchange.

A fifth object of the present invention to provide a process of preparing a TAPtDH solution having a low impurity level.

A sixth object of the present invention is to provide a process of preparing a TAPtDH solution by means of anion exchange.

A seventh object of the present invention is to provide a process of preparing a TAPDH solution having a low impurity level.

An eighth object of the present invention to provide a process of preparing a TAPDH solution by means of anion exchange.

Other objects of the present invention will become apparent from the following description and Examples.

The present inventors have discovered that the above first and second objectives are achieved by providing a process of preparing hexaamminerhodium trihydroxide, comprising the steps of forming a solution of hexaamminerhodium (III) chloride by reacting a solution of rhodium (III) chloride and an excess amount of aqueous ammonia, heating the thus formed solution to impart thereto a pH of 7.5 to 8.0, and contacting the hexaamminerhodium (III) chloride solution with an anion exchange resin having an OH form.

The present inventors have discovered that the above third and fourth objectives are achieved by providing a process of preparing hexaammineplatinum (IV) tetrahydroxide, comprising the steps of dissolving ammonium chloroplatinate into aqueous ammonia, and contacting the resulting solution of hexaammineplatinum (IV) tetrachloride with an anion exchange resin having an OH form.

The present inventors have discovered that the fifth and sixth objectives are achieved by providing a process of preparing tetraammineplatinum (II) dihydroxide, comprising the steps of contacting a solution of tetraammineplatinum (II) dichloride with an anion exchange resin having an OH form.

The present inventors have discovered that the seventh and eighth objectives are achieved by providing a process of preparing tetraamminepalladium dihydroxide, comprising the steps of contacting a solution of tetraamminepalladium dichloride with an anion exchange resin having an OH form.

In accordance with the present invention, a HARhTH solution having a remarkably reduced chloride ion concentration and high stability (i.e., the HARhTH contained therein is not easily decomposed) is obtained.

Also in accordance with the present invention, a HAPtTH solution having a remarkably reduced chloride ion concentration and high stability is obtained.

Also in accordance with the present invention, a TAPtDH solution having a remarkably reduced chloride ion concentration and high stability is obtained.

Also in accordance with the present invention, a TAPDH solution having a remarkably reduced chloride ion concentration and high stability is obtained.

Furthermore, a silver component is not required in this invention due to use of the anion exchange resin. Accordingly, silver ion is not present in the product solutions of HARhTH, HAPtTH, TAPtDH and TAPDH in accordance with the present invention, such that the purity of the respective product solutions is elevated.

As used herein, the term "intermediate chloride" solution refers to a solution of the chloride of the desired product prior to contacting with the anion exchange resin. For example, in the preparation of HARhTH in accordance with the present invention, the intermediate chloride is hexaamminerhodium (III) chloride.

As used herein, the term "space velocity" (SV) in units of hr.$^{-1}$ refers to the ratio of feed rate in volumetric units to the volume of anion exchange resin packed in a treating column.

It is to be understood that both the foregoing general description and the following detailed description are exemplary and explanatory, but are not restrictive of the invention.

DETAILED DESCRIPTION OF THE INVENTION

The anion exchange resin for use in this invention is previously treated to have an OH form. The amount of the anion exchange resin for use in this invention is most desirably not less than twice the theoretical (i.e., equivalent) amount necessary for complete chloride exchange of the intermediate chloride compound.

A strongly basic anion exchange resin is preferably employed as the anion exchange resin, for example, DIAION SA10A and DIAION SA12A available from Mitsubishi Kasei Kogyo K.K.

In order to convert the anion exchange resin into the OH form before contacting with the intermediate chloride solution, one liter of the anion exchange resin is, for example, packed in a column through which three liters of sodium hydroxide of about 5 wt % are passed at a space velocity (SV) of 2, followed by passing pure water therethrough at a space velocity of 2 until the pH of the effluent reaches about 7 to remove sodium ion.

Although the intermediate chloride solution may be contacted with an anion exchange resin of the OH form, for example, in a beaker by means of mixing and stirring, the intermediate chloride solution is preferably passed through an anion exchange resin layer packed in a column in a manner similar to that employed for converting the anion exchange resin into the OH form. This procedure is convenient and requires no separation step and the like, and is preferably employed in successive procedures.

I. Preparation of Hexaamminerhodium Trihydroxide:

A solution of hexaamminerhodium (III) chloride may be obtained by adding excess aqueous ammonia to a solution of rhodium chloride which is reacted, for example, in an autoclave at a pressure of 1.5 to 5 kg/cm$^2$ and at the temperature of 100° to 150° C. for about 24 hours.

Then, in order to remove excess ammonia, the solution of hexaamminerhodium (III) chloride is heated at a high temperature of, for example, 90° to 98° C. until the pH of the solution becomes weakly basic (i.e., a pH of 7.5 to 8.0), followed by cooling to room temperature to prepare the desired hexaamminerhodium (III) chloride.

In order to complete stable anion exchange when contacting with the anion exchange resin, the above solution is preferably adjusted to pH 7.5 to 8.0 (weakly basic).

Next, the hexaamminerhodium (III) chloride solution is contacted with the anion exchange resin to obtain the desired HARhTH solution.

The amount of the anion exchange resin which is contacted with the hexaamminerhodium (III) chloride solution is not less than twice the theoretical amount needed to completely carry out exchange between the chloride ion of the rhodium compound and the OH ion of the anion exchange resin. More particularly, the amount of the anion exchange resin is related to the anion exchange equilibrium.

The hexaamminerhodium (III) chloride solution may be passed through an anion exchange column (prepared as described above to have an OH form) at a space velocity (SV) of from 0.1 to 0.5. More preferably, SV is about 0.2.

Although the concentration of the solution of the hexaamminerhodium (III) chloride passing through the anion exchange resin is not particularly restricted, a dilute solution may require a concentration procedure following anion exchange, while a concentrated solution may result in the generation of a precipitate while passing through the anion exchange column. Accordingly, the concentration of the hexaamminerhodium (III) chloride solution prior to anion exchange is preferably adjusted to from 40 g/liter to 100 g/liter.

A product HARhTH solution of from 5–40 g.Rh/liter may be recovered by washing the anion exchange resin with water, and collecting the column eluent.

In accordance with the above process, a HARhTH solution having a low impurity level of from 0.01–0.3 g·Cl$^-$/liter is obtained.

II. Preparation of Hexaammineolatinum (IV) Tetrahydroxide:

A hexaammineplatinum (IV) tetrachloride [Pt(NH$_3$)$_6$Cl$_4$] solution can be prepared by, for example, forming a precipitate of ammonium chloroplatinate by adding aqueous ammonia to a chloroplatinic acid solution, separating the precipitate by filtration, and heating the precipitate under pressure after addition of aqueous ammonia thereto.

Next, the hexaammineplatinum (IV) tetrachloride solution is contacted with an anion exchange resin to obtain the desired HAPtTH solution.

The amount of the anion exchange resin which is contacted with the hexaammine platinum (IV) tetrachloride solution is not less than twice the theoretical amount needed to completely carry out exchange between the chloride ion of the platinum compound and the OH ion of the anion exchange resin. More particularly, the amount of the anion exchange resin is related to the anion exchange equilibrium.

The hexaammineplatinum (IV) tetrachloride solution may be passed through an anion exchange column (prepared as described above to have an OH form) at a space velocity (SV) of from 0.1 to 0.5. More preferably, SV is about 0.2.

Although the concentration of the solution of the hexaammineplatinum (IV) tetrachloride passing through the anion exchange resin is not particularly restricted, a dilute solution may require a concentration procedure following anion exchange, while a concentrated solution may result in the generation of a precipitate while passing through the anion exchange column. Accordingly, the concentration of the hexaammineplatinum (IV) tetrachloride solution prior to anion exchange is preferably adjusted to from 5 g/liter to 20 g/liter.

A product HAPtTH solution of from 5–40 g Pd/liter may be obtained by washing the anion exchange resin with water, and collecting the column eluent.

In accordance with the above process, a HAPtTH solution having a low impurity level of from 0.01–0.3 g·Cl$^-$/liter is obtained.

III. Preparation of Tetraammineolatinum (II) Dihydroxide

A tetraammineplatinum (II) dichloride [Pt(NH$_3$)$_4$Cl$_2$] solution can be prepared, for example, as follows. The tetravalent platinum ion of chloroplatinic acid is reduced to its bivalent state by adding hydrazine hydrochloride to a chloroplatinic acid solution which is then divided into two equal parts. Aqueous ammonia is added to a first part thereof to prepare tetraammineplatinum (II) dichloride, and the remaining part is then added thereto to obtain Magnus' salt [Pt(NH$_3$)$_4$][PtCl$_4$] as a precipitate.

Then, 28 wt % aqueous ammonia is added to the precipitate which has been separated by filtration to dissolve the precipitate under heating to prepare tetraammineplatinum (II) dichloride.

Next, the tetraammineplatinum (II) dichloride solution is contacted with the anion exchange resin to obtain the desired TAPtDH solution.

The amount of the anion exchange resin which is contacted with the tetraammineplatinum (II) dichloride solution is not less than twice the theoretical amount needed to completely carry out exchange between the chloride ion of the platinum compound and the OH ion of the anion exchange resin. More particularly, the amount of the anion exchange resin is related to the anion exchange equilibrium.

The tetraammineplatinum (II) dichloride solution may be passed through an anion exchange column (prepared as described above to have an OH form) at a space velocity (SV) of from 0.1 to 0.5. More preferably, SV is about 0.2.

Although the concentration of the solution of the tetraammineplatinum (II) dichloride passing through the anion exchange resin is not particularly restricted, a dilute solution may require a concentration procedure following anion exchange, while a concentrated solution may result in the generation of a precipitate while passing through the anion exchange column. Accordingly, the concentration of the tetraammineplatinum (II) dichloride solution prior to anion exchange is preferably adjusted to from 15 g/liter to 20 g/liter.

A product TAPtDH solution of from 5–50 g Pt/liter may be recovered by washing the anion exchange resin with water, and collecting the column eluent.

In accordance with the above process, a TAPtDH solution having a low impurity level of from 0.01–0.3 g·Cl$^-$/liter is obtained.

IV. Preparation of Tetraamminepalladium Dihydroxide

A tetraamminepalladium dichloride {Pd(NH$_3$)$_4$Cl$_2$} solution can be prepared, for example, by reacting aqueous ammonia with crystals of dichlorodiamine palladium [Pd(NH$_3$)$_2$Cl$_2$] with heating and stirring. Alternatively, a tetraamminepalladium dichloride solution can be prepared by reacting a palladium chloride solution with excess aqueous ammonia to produce [Pd(NH$_3$)$_4$][PdCl$_4$], which may then be converted into the desired compound by heating.

The tetraamminepalladium dichloride solution thus prepared is contacted with the anion exchange resin to obtain the desired TAPDH solution.

The amount of the anion exchange resin which is contacted with the tetraamminepalladium dichloride solution is not less than twice the theoretical amount needed to completely carry out exchange between the chloride ion of the palladium compound and the OH ion of the anion exchange resin. More particularly, the amount of the anion exchange resin is related to the anion exchange equilibrium.

The tetraamminepalladium dichloride solution may be passed through an anion exchange column (prepared as described above to have an OH form) at a space velocity (SV) of from 0.1 to 0.5. More preferably, SV is about 0.2.

Although the concentration of the solution of the tetraamminepalladium dichloride passing through the anion exchange resin is not particularly restricted, a dilute solution may require a concentration procedure following anion exchange, while a concentrated solution may result in the generation of a precipitate while passing through the anion exchange column. Accordingly, the concentration of the tetraamminepalladium dichloride solution prior to anion exchange is preferably adjusted to from 40 g/liter to 100 g/liter.

A product TAPDH solution of from 5–40 g·Pd/liter may be recovered by washing the anion exchange resin with water, and collecting the column eluent.

In accordance with the above process, a TAPDH solution having a low impurity level of from 0.01–0.3 g·Cl/liter is obtained.

The present invention will be further described by way of the following Examples and comparative Examples to illustrate aspects of this invention, which Examples are not intended to limit the scope or applicability of this invention.

EXAMPLE 1

To 100 ml of an aqueous solution of rhodium chloride (containing 20 g of Rh) were added 400 ml of aqueous ammonia (28 wt %), which mixture was then reacted for 24 hours in an autoclave stirred at 500 rpm at a pressure of 1.5 to 5 kg/cm$^2$ and a temperature of 120° C.

After reaction, the solution was cooled and filtered. The filtrate was placed in a beaker and heated at 95° C. using a hot water bath until the pH became 7.7. After heating, the filtrate was cooled to room temperature.

Then, 4 liters of the cooled filtrate were passed at a space velocity (SV) of 0.2 through a layer of 200 ml of a strongly basic anion exchange resin (Mitsubishi Kasei Kogyo K.K., DIAION SA10A) which had been previously converted to an OH form, and packed in a glass column having a diameter of 50 mm.

After passing the filtrate through the column, the anion exchange resin was washed by passing therethrough pure water at a space velocity of 0.2. The eluent was collected to obtain 2.5 liters of a HARhTH product solution of 10 g·Rh/liter.

Potentiometric titration of a sample of the above product solution was carried out with 1/10N hydrochloric acid. The amount of hydrochloric acid required for titration indicated the existence of 3 mols of OH ion per 1 mol of rhodium ion, to thereby confirm preparation of the desired HARhTH product.

The concentration of chloride ion in the product solution was not more than 100 mg/liter.

EXAMPLE 2

To 100 ml of an aqueous solution of rhodium chloride (containing 20 g of Rh) were added 400 ml of aqueous ammonia (28 wt %), which mixture was then reacted for 24 hours in an autoclave stirred at 500 rpm at a pressure of 1.5 to 5 kg/cm$^2$ and a temperature of 130° C.

After reaction, the solution was cooled and filtered. The filtrate was placed in a beaker and heated at 95° C. using a hot water bath until the pH became 8.0. After heating, the filtrate was cooled to room temperature.

Then, 4 liters of the cooled filtrate were passed at a space velocity (SV) of 0.2 through a layer of 200 ml of strongly basic anion exchange resin (Mitsubishi Kasei Kogyo K.K., DIAION SA10A) which had been previously converted to an OH form, and packed in a glass column having a diameter of 50 mm.

After passing the filtrate through the column, the anion exchange resin was washed by passing therethrough pure water at a space velocity of 0.2. The eluent was collected to obtain 2.5 liters of a HARhTH product solution of 10 g·Rh/liter.

Potentiometric titration of a sample of the above HARhTH product solution was carried out with 1/10N hydrochloric acid. The amount of hydrochloric acid required for titration indicated the existence of 3 mols of OH ion per one mol of rhodium ion, to thereby confirm preparation of the desired HARhTH product.

The concentration of chloride ion in the product solution was not more than 100 mg/liter.

COMPARATIVE EXAMPLE 1

To 100 ml of an aqueous solution of rhodium chloride (containing 20 g of Rh) were added 400 ml of aqueous ammonia (28 wt %), which mixture was then reacted for 24 hours in an autoclave stirred at 500 rpm at a pressure of 1.5 to 5 kg/cm$^2$ and a temperature of 120° C.

After reaction, the solution was cooled and filtered. The filtrate was placed in a beaker and heated at 95° C. using a hot water bath until the pH became 7.2. After heating, the filtrate was cooled to room temperature.

Then, silver oxide powder was added to the cooled filtrate with stirring until the formation of a white precipitate of silver chloride was no longer observed, and the precipitate was filtered and washed with pure water.

The resulting filtrate solution contained mainly HARhTH, but furthermore contained silver in an amount of 100 mg/liter and chloride ion in an amount of 100 mg/liter.

EXAMPLE 3

A HARhTH solution was prepared in the same manner as in Example 1, except that the amount of anion exchange resin packed in the column in relation to the chloride ion content of the hexaamminerhodium chloride solution (expressed as an equivalent ratio) was varied as indicated in Table 1 below. The concentration of chloride ion remaining in the product solution was measured, the results of which are also shown in Table 1.

TABLE 1

| Volume of Anion Exchange Resin Packed in Column (liters) | Theoretical Amount of Anion Exchange Resin to Chloride Ion (Equivalents) | Concentration of Cl$^-$ Ion in HARhTH Solution (mg/liter) |
| --- | --- | --- |
| 1 | 0.5 | 10,700 |
| 2 | 1.0 | 1,000 |
| 3 | 1.5 | 300 |
| 4 | 2.0 | not more than 100 |
| 5 | 2.5 | not more than 100 |
| 6 | 3.0 | not more than 100 |
| 7 | 3.5 | not more than 100 |

It is clearly seen from the above noted results that the chloride ion remaining in the HARhTH product solution in accordance with the present invention was reduced to not more than 100 mg/liter. Accordingly, a HARhTH solution of high purity is obtained when the theoretical volume of the anion exchange resin to chloride ion is not less than 2 equivalents.

EXAMPLE 4

Ammonium chloride was added to 100 ml of a solution of chloroplatinic acid (containing 200 g/liter of Pt) in a one-liter beaker to precipitate ammonium chloroplatinate. The precipitate was filtered through a filter paper made of pulp.

The precipitate was then transferred in an autoclave to which 300 ml of aqueous ammonia (28 wt %) were added, which mixture was maintained for three hours at 73° C. and a pressure of 1.8 to 2.0 kg/cm$^2$.

The solution taken from the autoclave was then transferred to a beaker, and heated at 95° C. using a hot water bath until the pH became 7 to prepare a solution of hexaammineplatinum (IV) tetrachloride.

Then, after cooling to room temperature, the solution was passed at a space velocity (SV) of 0.2 through 3 liters of a strongly basic anion exchange resin (Mitsubishi Kasei Kogyo K.K., DIAION SA10A) which had been previously converted to an OH form, and packed in a glass column having a diameter of 100 mm.

After passing the solution through the column, the anion exchange resin was washed by passing therethrough pure water at a space velocity of 0.2. The eluent was collected to obtain 10 liters of a HAPtTH product solution of 10 g·Pt/liter.

Potentiometric titration of a sample of the above product solution was carried out with 1/10N hydrochloric acid. The amount of hydrochloric acid required for titration indicated the existence of 4 mols of OH ion per mol of the platinum ion, to thereby confirm preparation of the desired HAPtTH product.

The concentration of chloride ion in the product solution was 40 mg/liter.

COMPARATIVE EXAMPLE 2

Silver oxide was continuously added to a hexaammineplatinum (IV) tetrachloride solution prepared in same manner as in Example 4 with stirring, until the formation of a white precipitate of silver chloride was no longer observed. The precipitate was filtered and washed with pure water.

The resulting filtrate solution contained mainly HAPtTH, but furthermore contained silver in an amount of 100 mg/liter.

EXAMPLE 5

A HAPtTH solution was prepared in the same manner as in Example 4, except that the amount of anion exchange resin packed in the column in relation to the chloride ion content of the hexaammineplatinum (IV) tetrachloride solution (expressed as an equivalent ratio) was varied as indicated in Table 2 below. The concentration of chloride ion remaining in the product solution was measured, the results of which are also shown in Table 2.

TABLE 2

| Volume of Anion Exchange Resin Packed in Column (liters) | Theoretical Amount of Anion Exchange Resin to Chloride Ion (Equivalents) | Concenration of $Cl^-$ Ion in HAPtTH Solution (mg/liter) |
| --- | --- | --- |
| 1 | 0.5 | 12,200 |
| 2 | 1.0 | 1,300 |
| 3 | 1.5 | 400 |
| 4 | 2.0 | 100 |
| 5 | 2.5 | not more than 100 |
| 6 | 3.0 | not more than 100 |
| 7 | 3.5 | not more than 100 |

It is clearly seen from the above noted results that the chloride ion remaining in the HAPtTH product solution in accordance with the present invention was reduced to not more than 100 mg/liter. Accordingly, a HAPtTH solution of high purity is obtained when the theoretical volume of the anion exchange resin to chloride ion is not less than 2 equivalents.

EXAMPLE 6

A tetraammineplatinum (II) dichloride solution was prepared by adding 100 ml of pure water to 10 g of Magnus' salt $\{Pt(NH_3)_4\}\{PtCl_4\}$ contained in a one-liter beaker. Next, 100 ml of 28 wt % aqueous ammonia was added thereto with stirring and heating using a hot water bath to dissolve the salt into the aqueous ammonia and effect a reaction therebetween.

After cooling to room temperature, the solution was passed at a space velocity (SV) of 0.2 through 200 ml of a layer of a strongly basic anion exchange resin (Mitsubishi Kasei Kogyo K.K., DIAION SA10A) which had been previously converted to an OH form, and packed in a glass column having a diameter of 50 mm.

After passing the solution through the column, the anion exchange resin was washed by passing therethrough pure water at a space velocity of 0.2. The eluent was collected to obtain 1 liter of a TAPtDH product solution of 10g·Pt/liter.

Potentiometric titration of a sample of the thus obtained product solution with 1/10N hydrochloric acid was carried out. The amount of hydrochloric acid required for titration indicated the existence of 2 mols of OH ion per 1 mol of platinum ion, to thereby confirm preparation of the desired TAPtDH product.

The concentration of chloride ion in the thus prepared TAPtDH product solution was 130 mg/liter.

EXAMPLE 7

The tetravalent platinum ion of chloroplatinic acid was reduced to its bivalent state by adding 6 g of hydrazine dichloride to 100 ml of chloroplatinic acid (Pt concentration: 200 g/liter) with stirring. The reduced solution was divided into two equal parts. To a first part thereof was added 28 wt % aqueous ammonia until the solution became colorless and transparent, and the remaining part was added to this colorless solution to obtain a precipitate of Magnus' salt. After filtering through a filter paper made of pulp, the precipitate was transferred to a beaker to which 150 ml of aqueous ammonia were added. The mixture was heated with stirring to maintain the temperature of the solution at 95° C. for 60 minutes, to thereby prepare a solution of tetraammineplatinum (II) dichloride.

Then, after the solution was cooled to room temperature, the solution was passed at a space velocity (SV) of 0.2 through 1.2 liters of a layer of a strongly basic anion exchange resin (Mitsubishi Kasei Kogyo K.K., DIAION SA10A) which had been previously converted to an OH form, and packed in a glass column having a diameter of 50 mm.

After passing the solution through the column, the anion exchange resin was washed by passing therethrough pure water at a space velocity of 0.2. The eluent was collected to obtain 4 liters of a TAPtDH product solution of 10g·Pt/liter.

Potentiometric titration of a sample of the above product solution was carried out with 1/10N hydrochloric acid. The amount of hydrochloric acid required for titration indicated the existence of 2 mols of OH ion per 1 mol of platinum ion, to thereby confirm preparation of the desired TAPtDH product.

The concentration of chloride ion in the product solution was 15 mg/liter.

COMPARATIVE EXAMPLE 3

Silver oxide was continuously added to a tetraammineplatinum (II) dichloride solution prepared in the same manner as in Example 6 with stirring, until the formation of a white precipitate of silver chloride was no longer observed. The precipitate was filtered and washed with pure water.

The resulting solution contained mainly TAPtDH, in addition to silver in an amount of 100 mg/liter.

EXAMPLE 8

A TAPtDH solution was prepared in the same manner as in Example 6, except that the amount of anion exchange resin packed in the column in relation to the chloride ion content of the tetraammineplatinum (II) dichloride solution (expressed as an equivalent ratio) was varied as indicated in Table 3 below. The concentration of chloride ion remaining in the product solution was measured, the results of which are also shown in Table 3.

TABLE 3

| Volume of Anion Exchange Resin Packed in Column (liters) | Theoretical Amount of Anion Exchange Resin to Chloride Ion (Equivalents) | Concentration of $Cl^-$ Ion in TAPtDH Solution (mg/ml) |
| --- | --- | --- |
| 1 | 0.5 | 12,000 |
| 2 | 1.0 | 1,000 |
| 3 | 1.5 | 350 |
| 4 | 2.0 | 130 |
| 5 | 2.5 | not more than 100 |
| 6 | 3.0 | not more than 100 |
| 7 | 3.5 | not more than 100 |

It is clearly seen from the above noted results that the chloride ion remaining in the TAPtDH product solution in accordance with the present invention was reduced to not more than 130 mg/liter. Accordingly, a TAPtDH solution of high purity is obtained when the theoretical volume of the anion exchange resin to chloride ion is not less than 2 equivalents.

EXAMPLE 9

A mixture of 500 ml of pure water and 100 g of dichlorodiammine palladium was prepared in a two-liter beaker. Next, 500 ml of 28 wt % of aqueous ammonia were added thereto with stirring and heating using a hot water bath to obtain a tetraamminepalladium dichloride solution.

Then, after cooling to room temperature, the solution was passed at a space velocity (SV) of 0.2 through 3 liters of a layer of a strongly basic anion exchange resin (Mitsubishi Kasei Kogyo K.K., DIAION SA10A) which had been previously converted into an OH form, and packed in a glass column having a diameter of 50 mm.

After passing the solution through the column, the anion exchange resin was washed by passing therethrough pure water at a space velocity of 0.2. The eluent was collected to obtain 10.5 liters of a TAPDH product solution of 20 g·Pd/liter.

Potentiometric titration of a sample of the thus obtained product solution with 1/10N hydrochloric acid was carried out. The amount of hydrochloric acid required for titration indicated the existence of about 2 mols of OH ion per 1 mol of the palladium ion, to thereby confirm preparation of the desired TAPDH product.

The concentration of chloride ion in the thus prepared TAPDH product solution was 21 mg/liter.

EXAMPLE 10

A tetraamminepalladium dichloride solution was prepared by adding 28 wt % aqueous ammonia to 100 ml of a palladium chloride solution (Pd: 100 g/liter) with heating at 80° C. for 30 minutes, to obtain a transparent solution.

Then, after cooling to room temperature, the solution was passed at a space velocity (SV) of 0.2 through 100 ml of a layer of a strongly basic anion exchange resin (Mitsubishi Kasei Kogyo K.K., DIAION SA10A) which had been previously converted to an OH form, and packed in a glass column having a diameter of 10 mm.

After passing the solution through the column, the anion exchange resin was washed by passing therethrough pure water at a space velocity of 0.2. The eluent was collected to obtain 0.4 liters of a TAPDH product solution of 20 g·Pd/liter.

Potentiometric titration of a sample of the thus obtained product solution with 1/10N hydrochloric acid was carried out. The amount of hydrochloric acid required for titration indicated the existence of about 2 mols of OH ion per 1 mol of palladium ion, to thereby confirm preparation of the desired TAPDH product.

The concentration of chloride ion in the thus prepared TAPDH product solution was 10 mg/liter.

COMPARATIVE EXAMPLE 4

Silver oxide was continuously added to a tetraamminepalladium dichloride solution prepared in the same manner as in Example 9 with stirring, until the formation of a white precipitate of silver chloride was no longer observed. The precipitate was filtered and washed with pure water.

The resulting solution contained mainly TAPDH, in addition to silver in an amount of 100 mg/liter.

EXAMPLE 11

A TAPDH solution was prepared in the same manner as in Example 9, except that the amount of anion exchange resin packed in the column to the chloride ion content of the tetraamminepalladium dichloride solution (expressed as an equivalent ratio) was varied as indicated in Table 4 below. The concentration of chloride ion remaining in the product solution was measured, the results of which are also shown in Table 4.

TABLE 4

| Volume of Anion Exchange Resin Packed in Column (liters) | Theoretical Amount of Anion Exchange Resin to Chloride Ion (Equivalents) | Concentration of $Cl^-$ Ion in TAPDH Solution (mg/ml) |
| --- | --- | --- |
| 1 | 0.5 | 1,100 |
| 2 | 1.0 | 100 |
| 3 | 1.5 | 45 |
| 4 | 2.0 | 21 |
| 5 | 2.5 | not more than 10 |
| 6 | 3.0 | not more than 10 |
| 7 | 3.5 | not more than 10 |

It is clearly seen from the above noted results that the chloride ion remaining in the TAPDH product solution in accordance with the present invention was reduced to not more than 21 mg/liter. Accordingly, a TAPDH product solution of high purity is obtained when the theoretical volume of the anion exchange resin to chloride ion is not less than 2 equivalents.

It should further be apparent to those skilled in the art that various changes in form and detail of the invention as shown and described above may be made. It is intended that such changes be included within the spirit and scope of the claims appended hereto.

What is claimed is:

1. A process of preparing hexaamminerhodium trihydroxide, comprising the steps of forming a solution of hexaamminerhodium (III) chloride by reacting a solution of rhodium chloride (III) and an excess amount of aqueous ammonia, heating the thus formed solution to impart thereto a pH of 7.5 to 8.0, and contacting the hexaamminerhodium (III) chloride solution with an anion exchange resin having an OH form.

2. The process as in claim 1 wherein the amount of the anion exchange resin which is contacted with the hexaamminerhodium (III) chloride solution is not less than twice the equivalent amount needed to completely carry out exchange between the chloride ion of the rhodium compound and the OH ion of the anion exchange resin.

3. A process of preparing hexaammineplatinum (IV) tetrahydroxide, comprising the steps of dissolving ammonium chloroplatinate into aqueous ammonia, and contacting the resulting solution of hexaammineplatinum (IV) tetrachloride with an anion exchange resin having an OH form.

4. The process as in claim 3, wherein the anion exchange resin is contacted with the hexaammineplatinum (IV) tetrachloride solution in an amount not less than twice the equivalent amount needed to completely carry out exchange between the chloride ion of the platinum compound and the OH ion of the anion exchange resin.

5. A process of preparing tetraammineplatinum (II) dihydroxide, comprising the steps of contacting a solution of tetraammineplatinum (II) dichloride with an anion exchange resin having an OH form.

6. The process as in claim 5, wherein the anion exchange resin is contacted with the tetraammineplatinum (II) dichloride solution in an amount not less than twice the equivalent amount needed to completely carry out exchange between the chloride ion of the platinum compound and the OH ion of the anion exchange resin.

7. A process of preparing tetraamminepalladium dihydroxide, comprising the steps of contacting a solution of tetraamminepalladium dichloride with an anion exchange resin having an OH form.

8. The process as in claim 7, wherein the anion exchange resin is contacted with the tetraamminepalladium dichloride solution in an amount not less than twice the equivalent amount needed to completely carry out exchange between the chloride ion of the palladium compound and the OH ion of the anion exchange resin.

* * * * *